(12) United States Patent
Villines

(10) Patent No.: US 10,955,065 B2
(45) Date of Patent: Mar. 23, 2021

(54) LOCKING APPARATUS FOR A ROTATING VALVE ACTUATOR

(71) Applicant: Iron Horse Industries, LLC, Weatherford, OK (US)

(72) Inventor: Benjamin K. Villines, Weatherford, OK (US)

(73) Assignee: Iron Horse Industries, LLC, Weatherford, OK (US)

( * ) Notice: Subject to any disclaimer, the term of this patent is extended or adjusted under 35 U.S.C. 154(b) by 129 days.

(21) Appl. No.: 16/288,180

(22) Filed: Feb. 28, 2019

(65) Prior Publication Data
US 2020/0278047 A1   Sep. 3, 2020

(51) Int. Cl.
*F16K 35/10*   (2006.01)

(52) U.S. Cl.
CPC ..................... *F16K 35/10* (2013.01)

(58) Field of Classification Search
USPC ...................................... 251/96, 89
See application file for complete search history.

(56) References Cited

U.S. PATENT DOCUMENTS

| | | | |
|---|---|---|---|
| 691,986 A | 1/1902 | Toback | |
| 853,053 A * | 5/1907 | Bennett | F16K 35/00 251/113 |
| 1,444,780 A * | 2/1923 | Davis | F16K 35/10 251/113 |
| 1,454,433 A * | 5/1923 | Franklin, Jr. | F16K 35/02 251/97 |
| 2,081,464 A | 6/1935 | Stewart | |
| 3,228,415 A | 1/1966 | Geiss | |
| 3,311,128 A | 3/1967 | Taylor | |
| 4,460,153 A | 7/1984 | Williams | |
| 5,215,112 A | 6/1993 | Davison | |
| 5,513,831 A * | 5/1996 | Seward | F16K 35/027 192/95 |
| 5,598,724 A | 2/1997 | Primeau | |
| 6,959,909 B2 | 11/2005 | Bancroft et al. | |
| 8,720,479 B2 | 5/2014 | Reinert | |
| 8,997,536 B2 | 4/2015 | Fuller et al. | |
| 9,169,943 B2 | 10/2015 | Grade et al. | |
| 9,267,613 B2 | 2/2016 | Rohde et al. | |

FOREIGN PATENT DOCUMENTS

GB      278033 A  *  9/1927 ............. F16K 35/10

* cited by examiner

*Primary Examiner* — Daphne M Barry
(74) *Attorney, Agent, or Firm* — Gary Peterson

(57) ABSTRACT

A locking apparatus for a rotatable lever of the type used to control a valve. The apparatus is formed from a wedge-like base element, a wedge-like blocking element and a plurality of guide posts. The base element is fixedly attached to the valve body. The blocking element is penetrated by plural guide passages. Each guide post passes through a corresponding guide passage in the blocking element, and is threaded into the base element. A spring is interposed between the blocking element and the base element. When the spring is uncompressed, the blocking element obstructs rotation of the lever. External pressure in opposition to the spring can urge the blocking element toward the base element. When the blocking element is so positioned, the lever may be rotated.

22 Claims, 19 Drawing Sheets

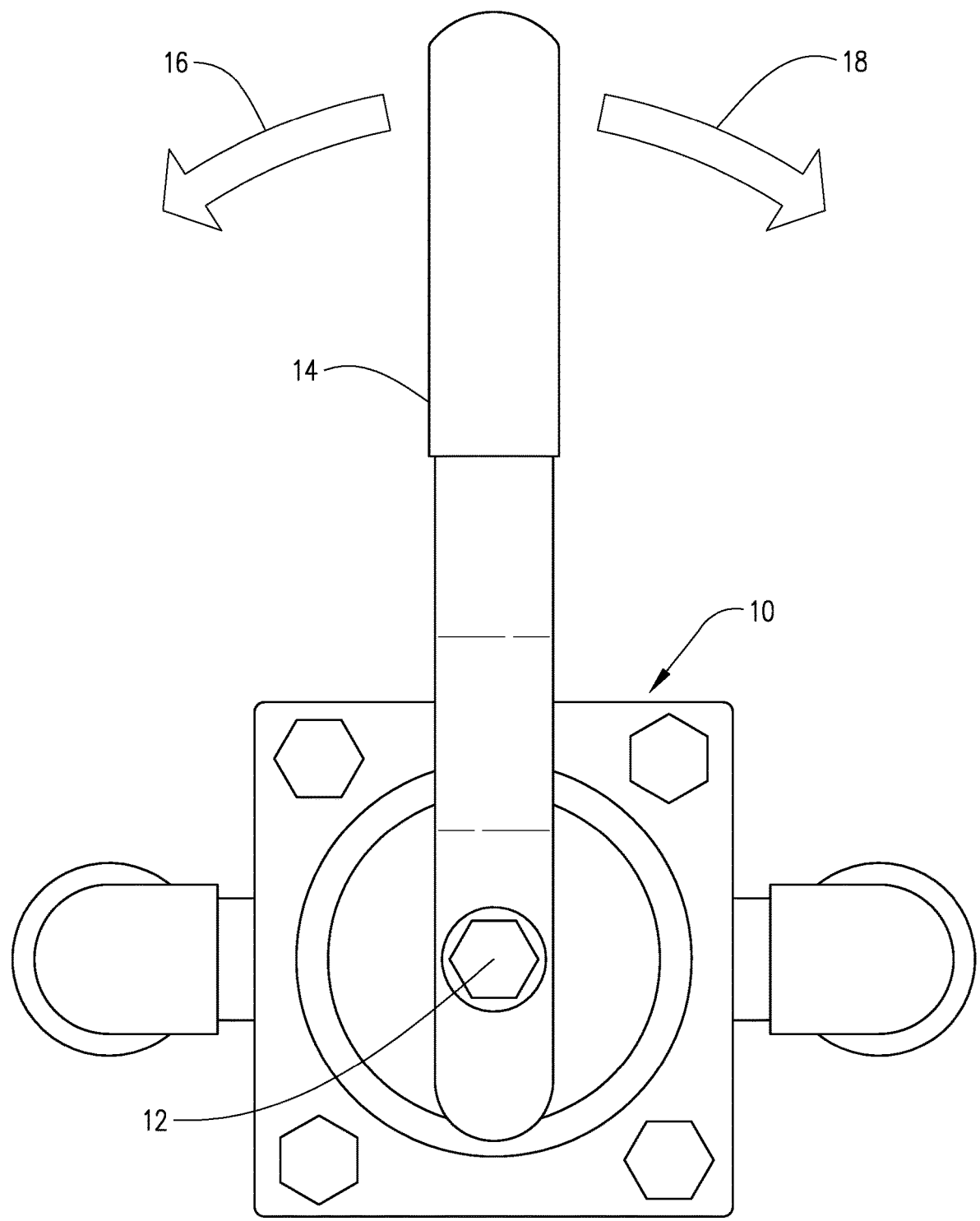
PRIOR ART

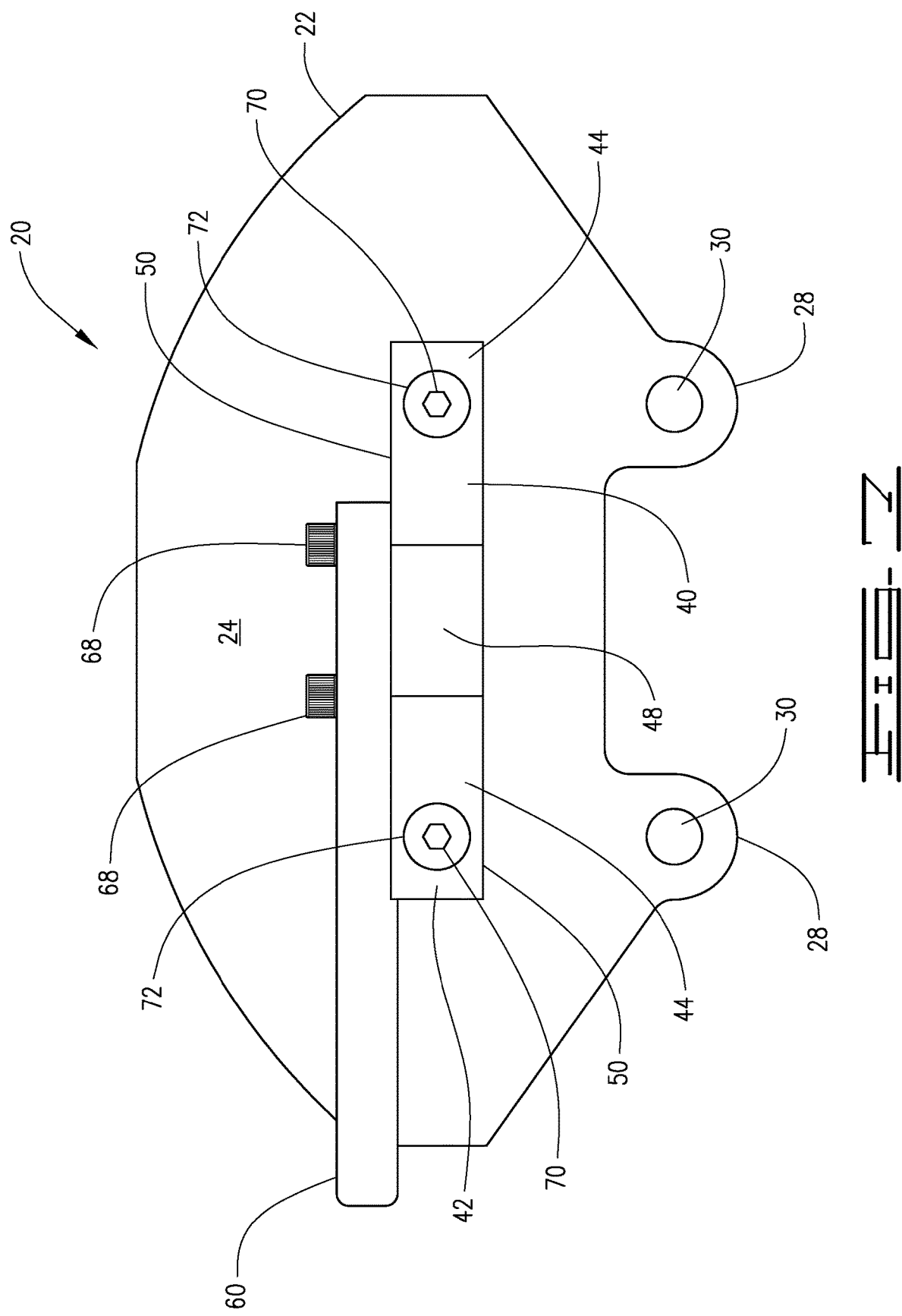

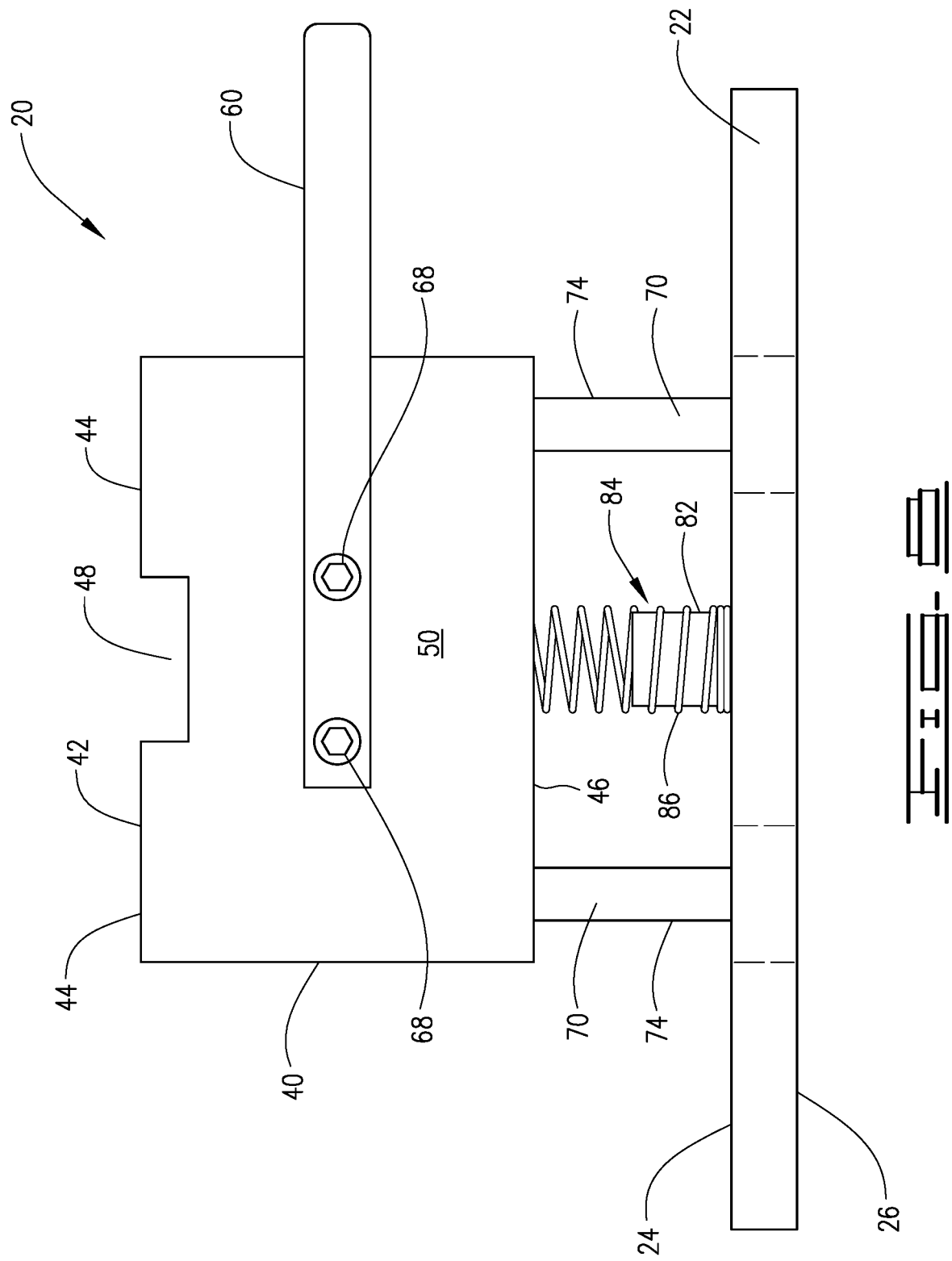

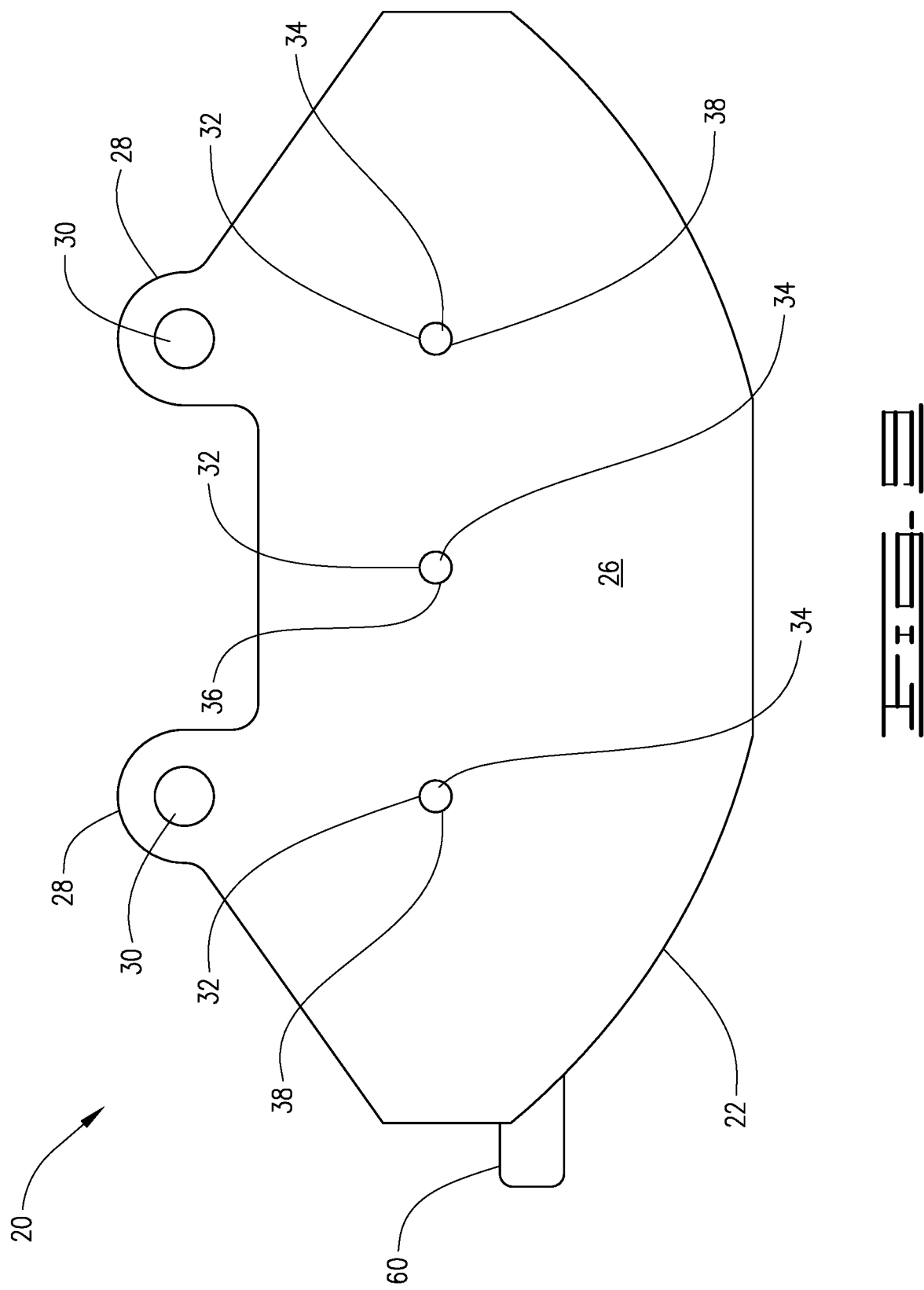

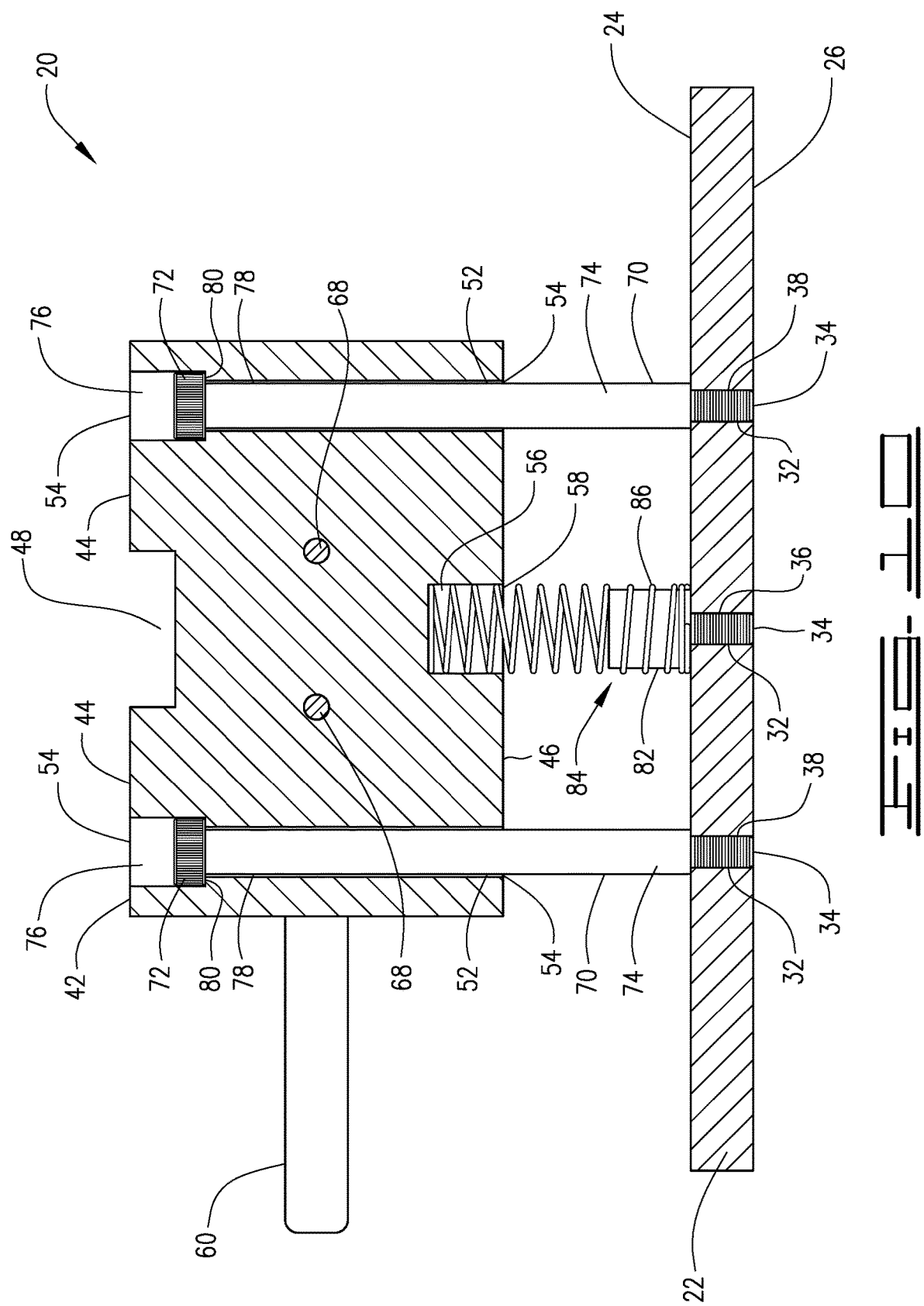

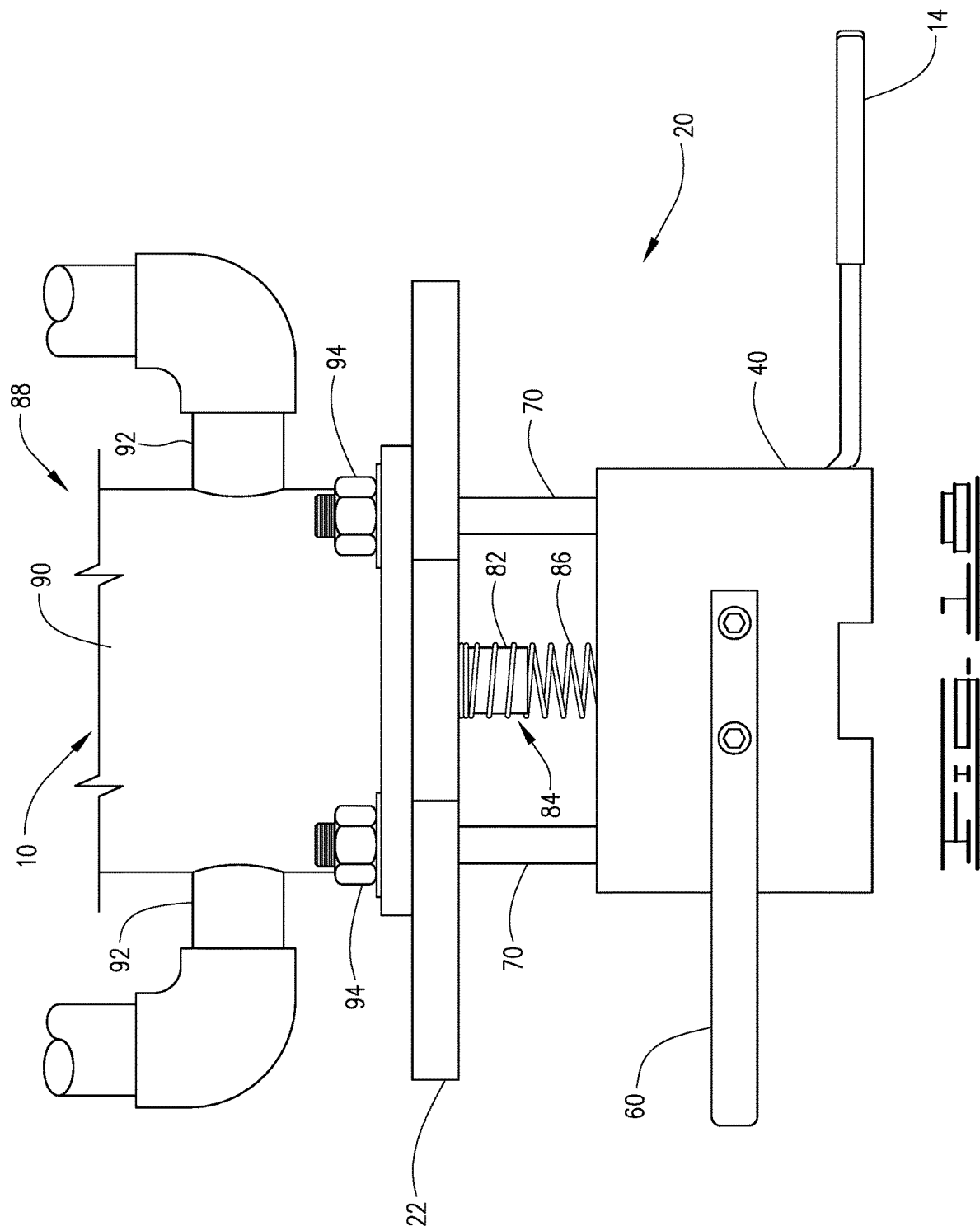

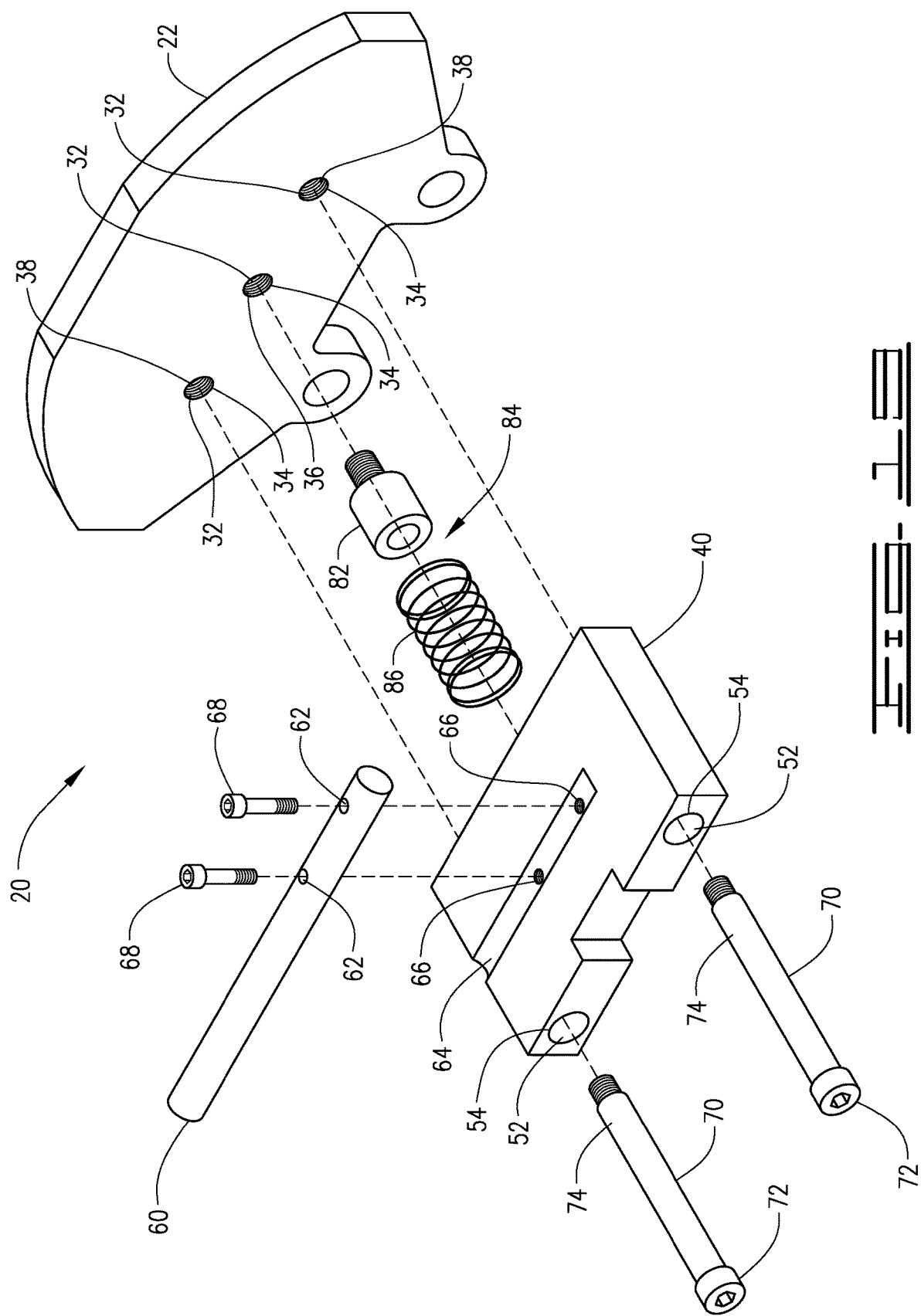

LOCKING APPARATUS FOR A ROTATING VALVE ACTUATOR

SUMMARY OF THE INVENTION

A locking apparatus for a rotatable lever having a path of travel. The apparatus is formed from a base element, a blocking element and a resilient biasing system. The base element is independent of the lever and positionable without the lever's path of travel. The blocking element is supported by the base element and selectively positionable both within and without the lever's path of travel. The blocking element is configured to obstruct rotation of the lever when positioned within its path of travel. The biasing system urges the blocking element toward a position within the lever's path of travel.

An apparatus is formed from a base element, a blocking element, a plurality of guide posts supported by the base element and a resilient biasing system. The blocking element has a plurality of guide passages formed therein. Each guide post is received within a corresponding one of the guide passages of the blocking element. The biasing system urges the blocking element away from the base element.

BRIEF DESCRIPTION OF THE DRAWINGS

FIG. 1 is a front elevation view of a prior art lever-operated valve. The handle is in its first position.

FIG. 6 is a left side elevation view of the apparatus shown in FIG. 4, taken along line 6-6.

FIG. 7 is a top plan view of the apparatus shown in FIG. 4, taken along line 7-7.

FIG. 8 is a rear elevation view of the apparatus shown in FIG. 5, taken along line 8-8.

FIG. 9 is a bottom plan view of the apparatus shown in FIG. 4, taken along line 9-9.

FIG. 10 is a cross-sectional front elevation view of the apparatus shown in FIG. 5, taken along line 10-10.

FIG. 18 is a top plan view of the system shown in FIG. 17.

FIG. 19 is an exploded view of the apparatus shown in FIG. 4.

DETAILED DESCRIPTION

Figure 2:
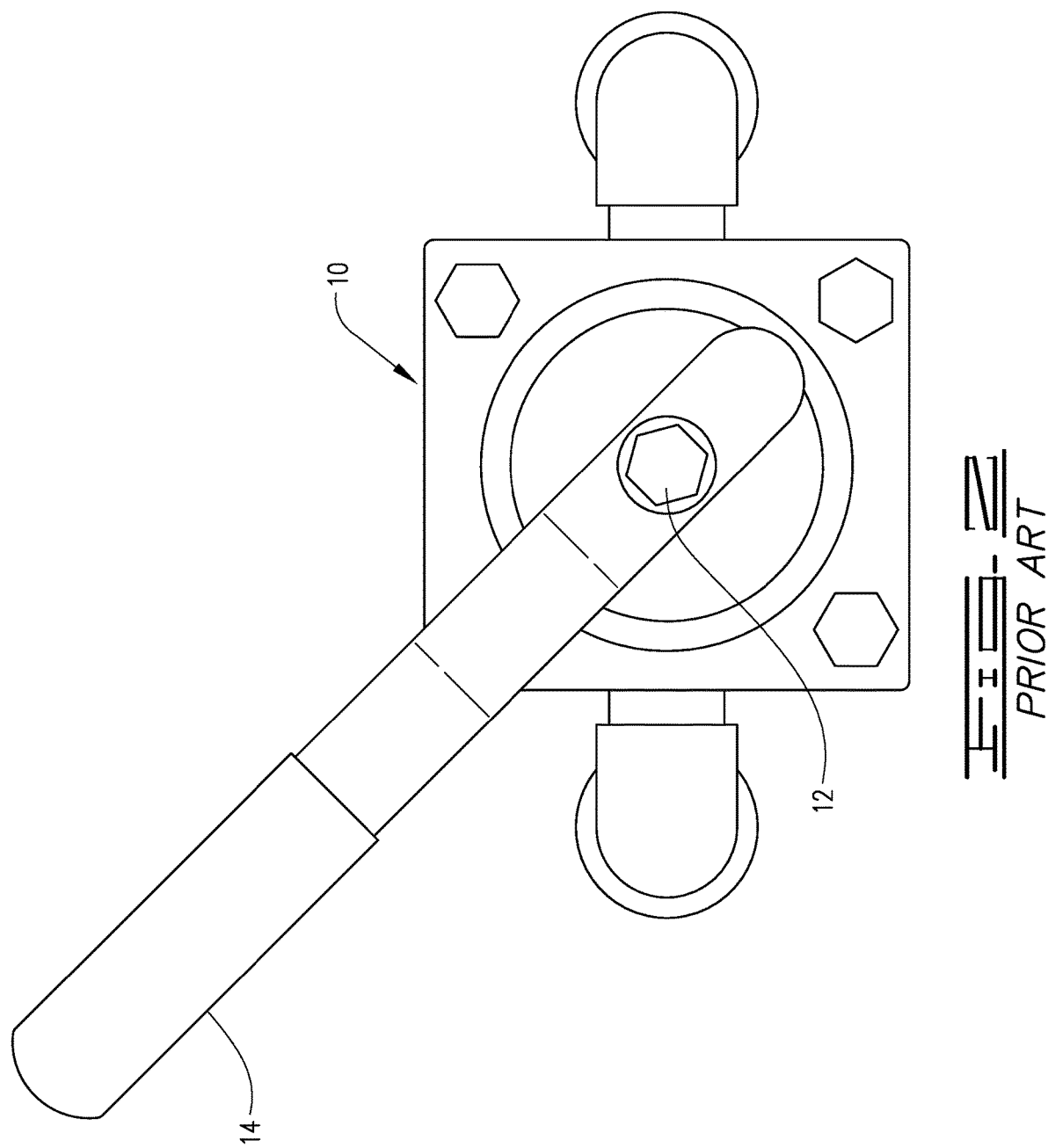
FIG. 2 is another front elevation view of the prior art valve shown in FIG. 1. The handle is in its second position.
Figure 3:
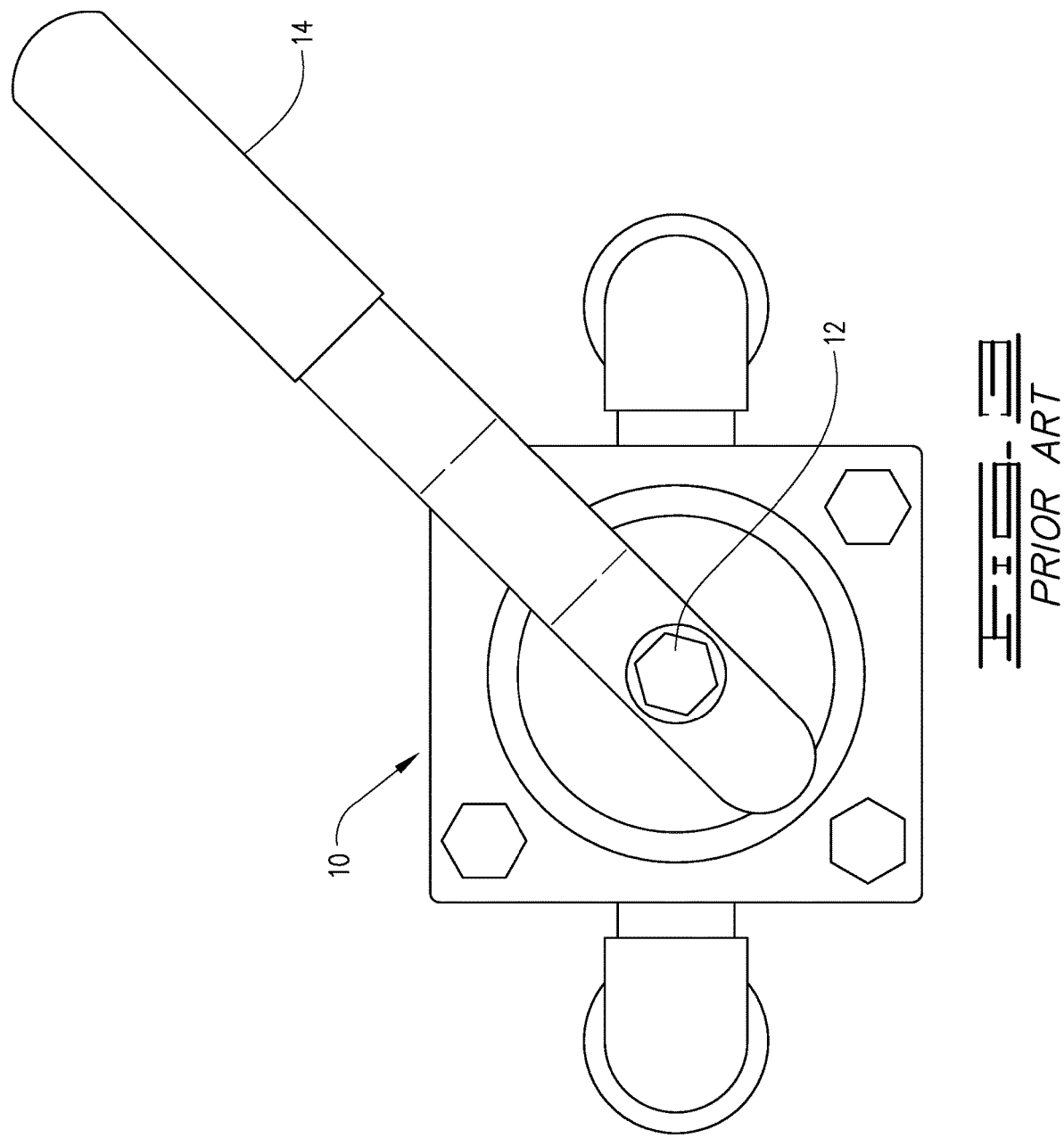
FIG. 3 is another front elevation view of the prior art valve shown in FIG. 1. The handle is in its third position.
Figure 4:
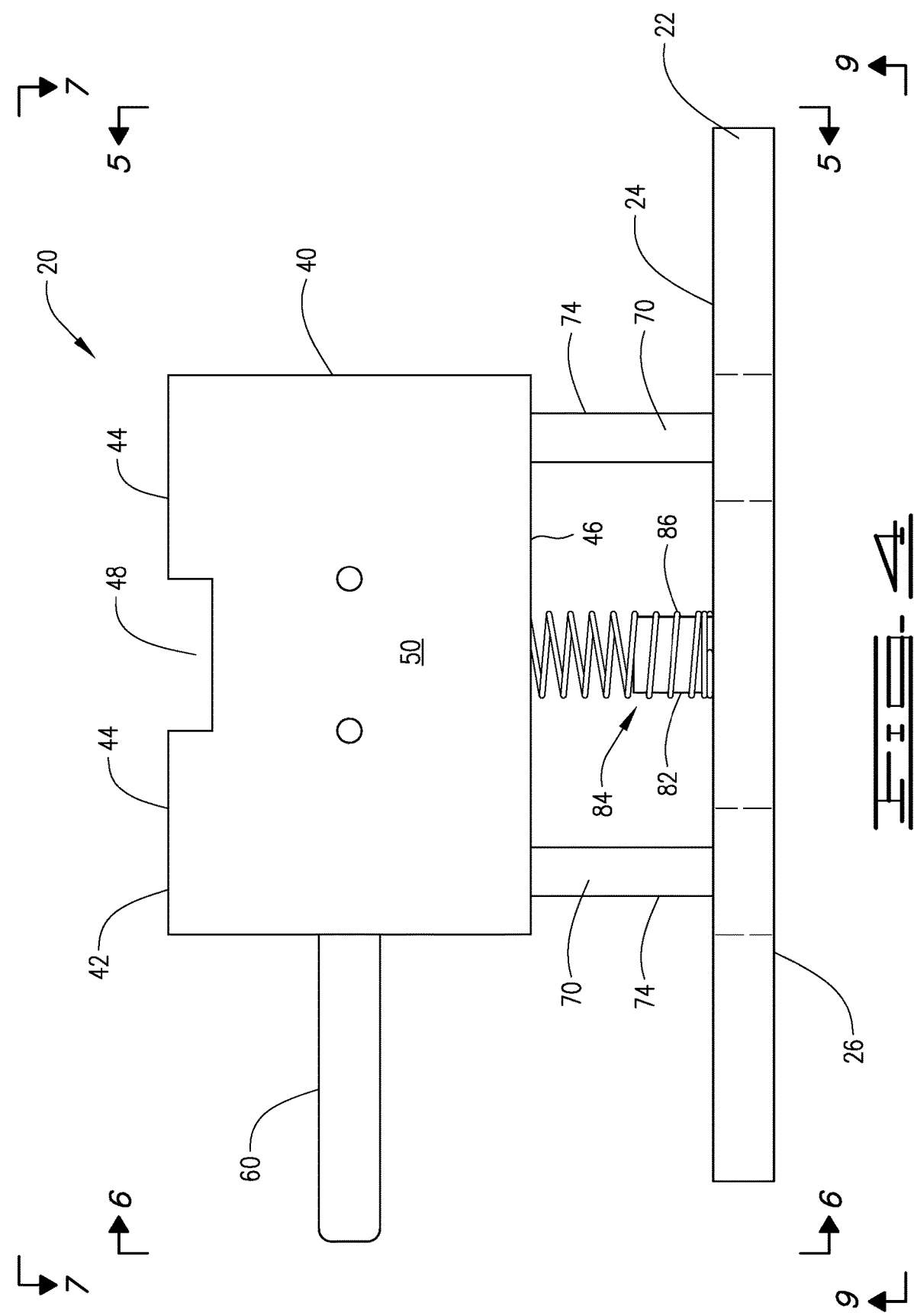
FIG. 4 is a front elevation view of a locking apparatus. The blocking element is in its extended position.
Figure 5:
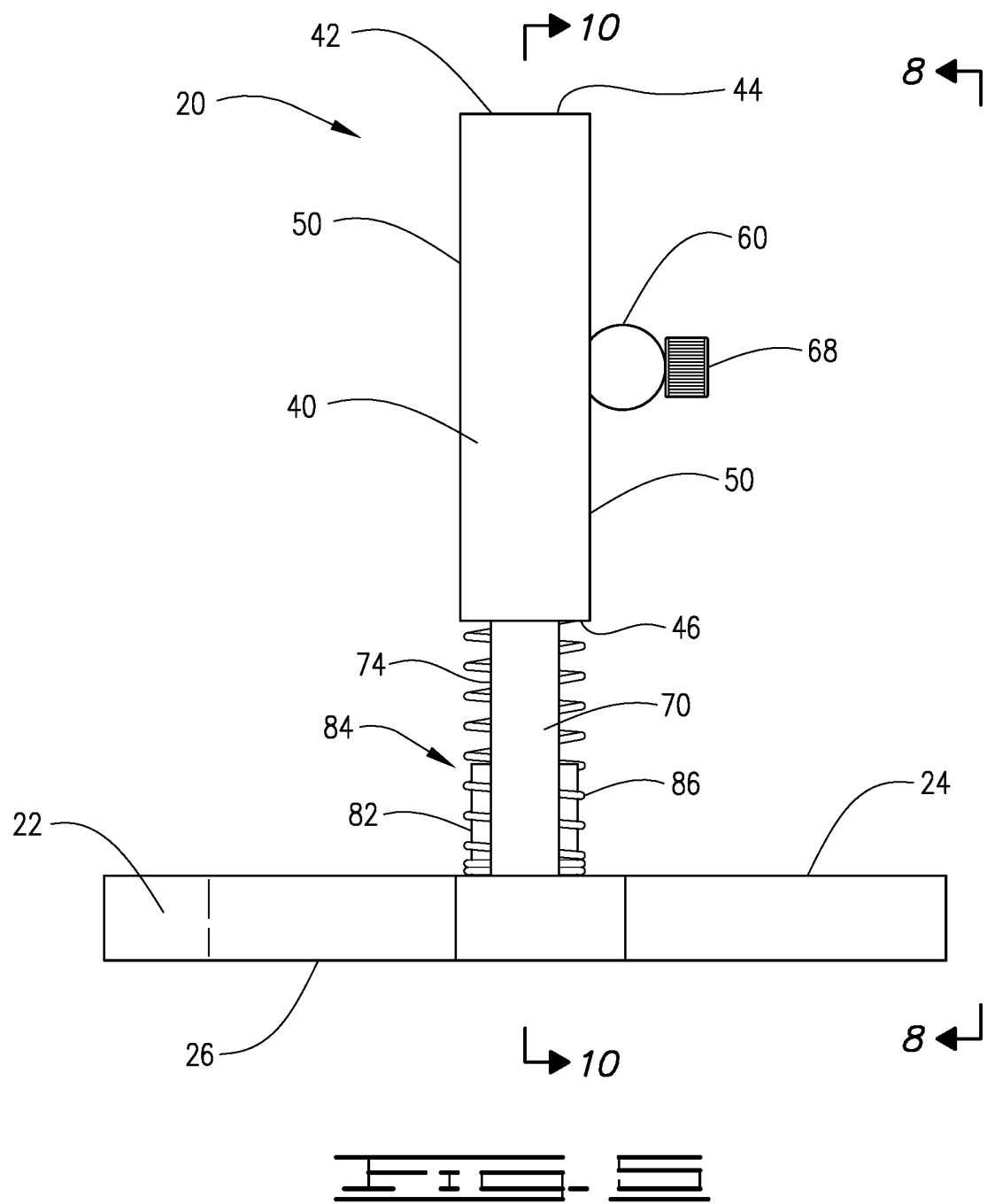
FIG. 5 is a right side elevation view of the apparatus shown in FIG. 4, taken along line 5-5.
Figure 5:
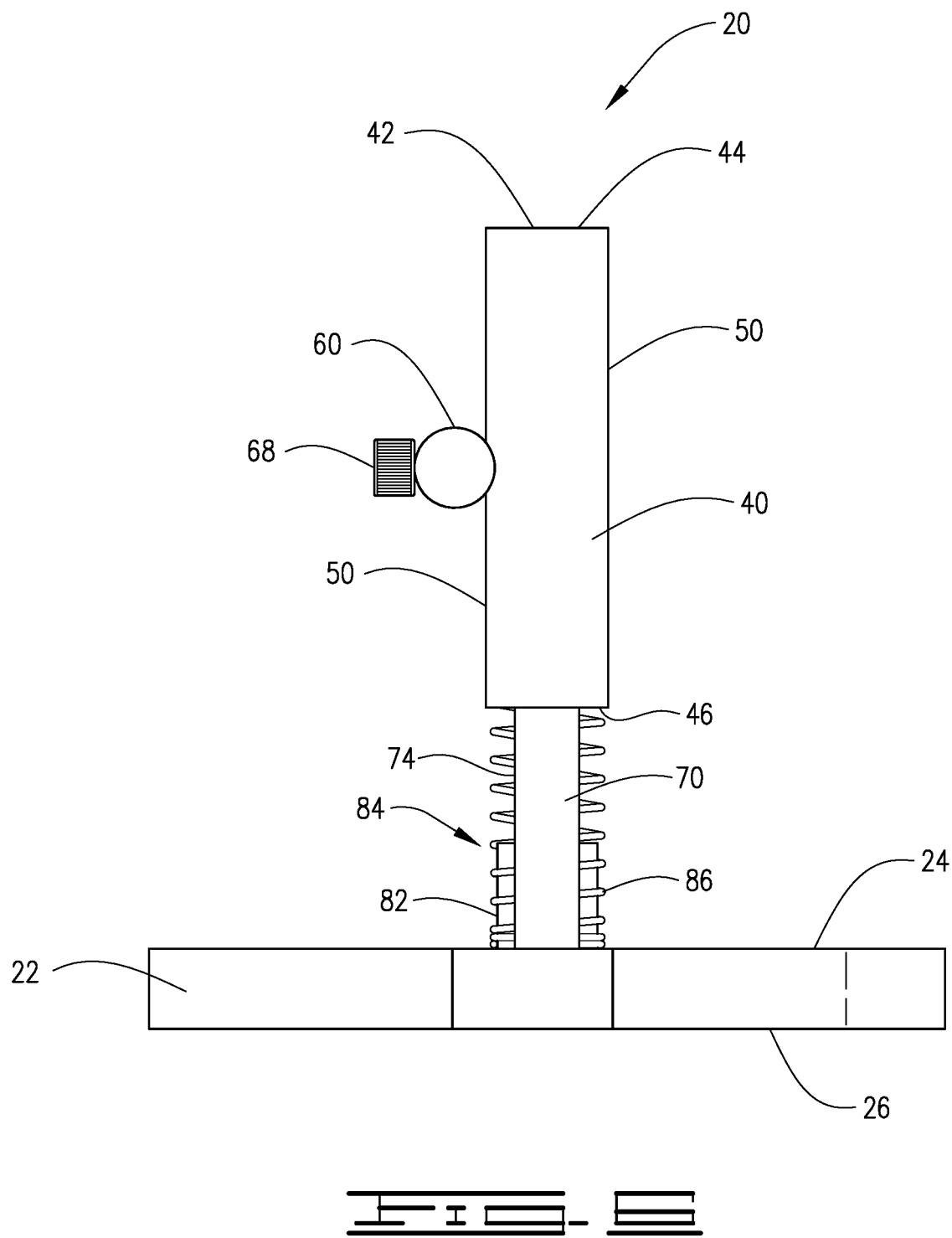

FIGS. 1-3 show a prior art lever-operated valve, designated by reference numeral 10. The valve 10 has a rotatable plug 12 that connects to a lever 14. The lever 14 may be rotated to any of several positions as required to actuate the plug 12 and open and close the valve 10. In the embodiment shown in FIGS. 1-3, the lever 14 has a central first position at 12 o'clock, and second and third positions in opposite clock directions from the first position. The first position is shown in FIG. 1, the second position is shown in FIG. 2, and the third position is shown in FIG. 3. The lever 14 may be moved from its first to its second position in a counterclockwise direction along a first path of travel 16. The lever 14 may be moved from its first to its third position in a clockwise direction along a second path of travel 18.

Valves of the type shown in FIGS. 1-3 are widely used to regulate flow of fluids in industrial installations, such as refineries and drilling rigs. These fluids are carried in fluid lines, and may be highly toxic, highly heated, highly pressurized, or some combination of these conditions. Undesired actuation of a valve that controls such a fluid line may produce catastrophic results, such as a fluid release that may endanger workers or the public at large.

FIGS. 4-11 and 19 show a locking apparatus 20 that may be used to prevent unauthorized access to a valve 10, as well as its unauthorized actuation. When the apparatus 10 is in use, coordinated attention and physical effort are required before a user can actuate the valve 10. The need for such attention and effort reduces the risk of absent-minded actuation.

The apparatus 20 comprises a base element 22 that is independent of the lever 14 and positionable without the lever's path of travel. Thus, when the apparatus 20 is used with the valve 10 shown in FIGS. 1-3, the base element 22 is positionable without the first path of travel 16, and without the second path of travel 18. The base element 22 is preferably a flat, crescent-shaped, wedge-like member having a flat external upper face 24 and a flat and parallel external lower face 26. Preferably, the base element 22 is substantially solid.

The base element 22 is positioned behind the lever 14 such that the upper face 24 is at least partially visible to a user of the lever 14. The base element 22 is attached either to the body of the valve 10, or to some other static structure near the lever 14. To facilitate such attachment, the base element 22 may be provided with one or more lugs 28, each having a fastener opening 30 extending therethrough. The upper face 24 may optionally be provided with indicia (not shown), such as lettering, that designate any or all of the positions of the lever 14.

The base element 22 is penetrated by a plurality of rectilinear and parallel passages 32, each of which interconnects the upper and lower faces 24 and 26. Preferably, at each of the faces 24 and 26, the openings 34 that the passages 32 form at that face are collinear. Also preferably, each of the passages 32 is internally threaded. In the embodiment shown in the Figures, the passages 32 are three in number, and include a single central passage 36 and a pair of flanking passages 38 on either side of the central passage 36.

The apparatus 20 further comprises a blocking element 40 supported by the base element 22. The blocking element 40 is selectively positionable both within and without the path of travel of the lever 14, and is configured to obstruct rotation of the lever 14 when positioned within the path of travel. When used with the valve 10 shown in FIGS. 1-3, the blocking element 40 is selectively positionable within and without the first path of travel 16, and is configured to obstruct rotation of the lever 14 when positioned within the first path of travel 16. The blocking element 40 is also selectively positionable within and without the second path of travel 18, and is configured to obstruct rotation of the lever 14 when positioned within the second path of travel 18.

The blocking element 40 is a substantially solid, wedge-like member having an external face 42. The major portion 44 of the face 42 is situated within a single plane. More preferably, the face 42 is a first face and the blocking element 40 includes an external second face 46 as well. The major portion of the second face 46 is situated within a single plane, and extends in spaced and parallel relationship to the major portion of the first face 42. The first face 42 is traversed by a rectilinear channel 48 having sufficient width to receive the lever 14.

More preferably, the blocking element 40 is prism-shaped, and most preferably has the shape of a right rectangular prism, of which the faces 42 and 46 are minor faces. The blocking element 40 further comprises a pair of spaced, opposed and parallel major faces 50 that interconnect the minor faces 42 and 46. Preferably, the major faces 50 extend in orthogonal relationship to the major portions of the faces 42 and 46.

The blocking element 40 is penetrated by a plurality of rectilinear and parallel guide passages 52, each of which interconnects the first and second faces 42 and 46. Preferably, at each of the faces 42 and 46, the openings 54 that the guide passages 52 form at that face are collinear. In the embodiment shown in the Figures, the guide passages 52 are two in number.

A blind and rectilinear spring passage 56 is formed in the blocking element 40 at its second face 46, intermediate the guide passages 52. The spring passage 56 opens at an opening 58 formed in the second face 46. Preferably, the opening 58 is collinear with the openings 54.

The passages 52 and 56 formed in the blocking element 40 should be positioned such that, when the base element 22 and the blocking element 40 are assembled, each of the passages 52 and 56 registers with a corresponding one and only one of the passages 32. Specifically, the central passage 36 should register in collinear alignment. with only the spring passage 56. Likewise, each flanking passage 38 should register, in collinear alignment with a corresponding one and only one of the guide passages 52.

A manually grippable handle 60 is attached to the blocking element 40. Preferably, the handle 60 and blocking element 40 are in a rigid relationship, and form a unitary structure. The handle 60 is preferably an elongate, rectilinear and rod-like member. At least one, and preferably a plurality of rectilinear fastener passages 62 are formed adjacent one end of the handle 60. Each fastener passage 62 fully penetrates the handle 60. In the embodiment shown in the Figures, the handle 60 includes two fastener passages 62.

A portion of the handle 60 is received within an elongate rectilinear groove 64 formed in one of the major faces 50 of the blocking element 40. One or more rectilinear fastener passages 66 are formed in the blocking element 40 and open within the groove 64. Preferably, at least a portion of each fastener passage 66 is internally threaded. The number and spacing of the fastener passages 66 should match the number and spacing of the fastener passages 62 formed in the handle 60. The fastener passages 66 may fully penetrate the blocking element 40, but should not cross either the guide passages 52 or the spring passage 56.

The handle 60 is positioned within the groove 64 of the blocking element 40, such that the fastener passages 62 and 66 register. An externally threaded fastener 68 is inserted into each pair of aligned fastener passages, and actuated. The external threads of each fastener 68 mate with the internal threads formed within its associated fastener passage 66. The fasteners 68 are provided in a number equal to the number of fastener passage 62. Once installed, the handle 60 projects outside the footprint of the blocking element 40, and can be manually gripped by a user.

The apparatus 20 further comprises a plurality of guide posts 70 supported by the base element 22. The guide posts 70 are preferably of identical construction, and are provided in a number equal to the number of guide passages 52 in the blocking element 40. The number of guide posts 70 should also equal the number of flanking passages 38 in the base element 22. Each guide post 70 is an elongate, rectilinear and rod-like structure. An enlarged head 72 is formed at one and only one end of each guide post 70, and an elongate shank 74 extends from the head 72. External threads are formed at the end of each guide post 70 opposite the head 68.

At each opening 54, a guide post 70 is inserted shank-first into one of the guide passages 52 formed within the blocking element 40. Each of the guide passages 52 receives a corresponding one and only one of the guide posts 70. As shown in FIG. 10, each guide passage 52 features an enlarged upper section 76 and an adjoining lower section 78. The upper section 76 opens at the first face 42, while the lower section 78 opens at the second face 46. The upper and lower sections 76 and 78 are joined at a shoulder-like constriction 80.

The upper section 76 of each guide passage 52 is sized to closely but clearingly receive the head 72 of a guide post 70, and to clearingly receive the shank 74 of the same guide post 70. The lower section 78 of each guide passage 52 has smaller cross-sectional dimensions than those of the upper section 78. The lower section 78 is sized to closely but clearingly receive the shank 74, but not the head 72, of a guide post 70. Movement of the head 72 through the guide passage 52, in the direction of the second face 46, is thus blocked by the constriction 80.

The apparatus 20 further comprises at least one spring post 82 supported by the base element 22. The spring posts 82 are provided in a number equal to the number of central passages 36 formed in the base element 22. The embodiment shown in the Figures includes a single spring post 82. Each spring post 82 is an elongate, rectilinear and rod-like structure having external threads formed at one of its ends. The threaded end of each spring post 82 is received within a corresponding one of the central passages 36. The internal threads formed in each central passage 36 mate with the external threads of its received spring post 82.

The apparatus 20 further comprises a resilient biasing system 84 that urges the blocking element 40 away from the base element 22, and toward a position within a path of travel of the lever 14. When used with the valve 10 shown in FIGS. 1-3, the biasing system 84 urges the blocking element 40 toward a position within both the first path of travel 16 and the second path of travel 18.

In one embodiment, the biasing system 84 is a spring. In the embodiment shown n the Figures, the biasing system is a coiled spring 86 that surrounds the spring post 82. At one of its ends, the spring 86 extends within the spring passage 56 and engages its blind end. At its other end, the spring 86 engages the external upper face 24 of the base element 22.

Major components of the apparatus 20 are preferably formed from a strong and durable material, such as steel. These major components include the base element 22, the blocking element 40, the handle 60, the fasteners 68, the guide posts 70, the spring post 82 and the spring 86.

The apparatus 20 is assembled by threading the spring post 82 into the central passage 36 of the base element 22. The coiled spring 86 is next installed around the spring post 82. The guide posts 70 are installed into the blocking element 40, and the blocking element 40 is then joined to the base element 22. During the junction process, the free end of the spring 86 is received within the spring passage 56. The spring 86 is compressed until the projecting shank 74 of each guide post 70 is received within a corresponding one of the flanking passages 38. While the spring 86 remains compressed, each received guide post 70 is rotated until is external threads mate with the internal threads formed in its associated flanking passage 38.

The assembled apparatus 20 is installed on, and cooperates with, a valve 10 of the type shown in FIGS. 1-3. The biasing system 84 of the apparatus 20 normally maintains the blocking element 40 in a position that blocks a path of travel of the lever 14. The heads 72 of the guide posts 70 engage the shoulder-like constriction 80 formed in the guide passages 52, and thereby prevent the biasing system 84 from pushing the blocking element 40 beyond the path of travel.

FIGS. 4-10 show the valve 10 with the biasing system 84 in its uncompressed and extended position, and with the lever 14 in its first position. In this configuration, the lever 14 engages the blocking element 40, and rests within the channel 48 that traverses the first face 42. The side walls of the channel 48 block any rotation of the lever 14 along either the first path of travel 16 or the second path of travel 18.

The blocking element 40 may be moved out of the path of travel of the lever 14 by applying an external pressure that urges the blocking element 40 toward the base element 22. The handle 60 may be manually gripped to assist in applying this pressure, which overcomes the opposing force of the spring 86. Under pressure, the blocking element 40 moves toward the base element 22, along a path orthogonal to its flat first face 42.

Figure 11:
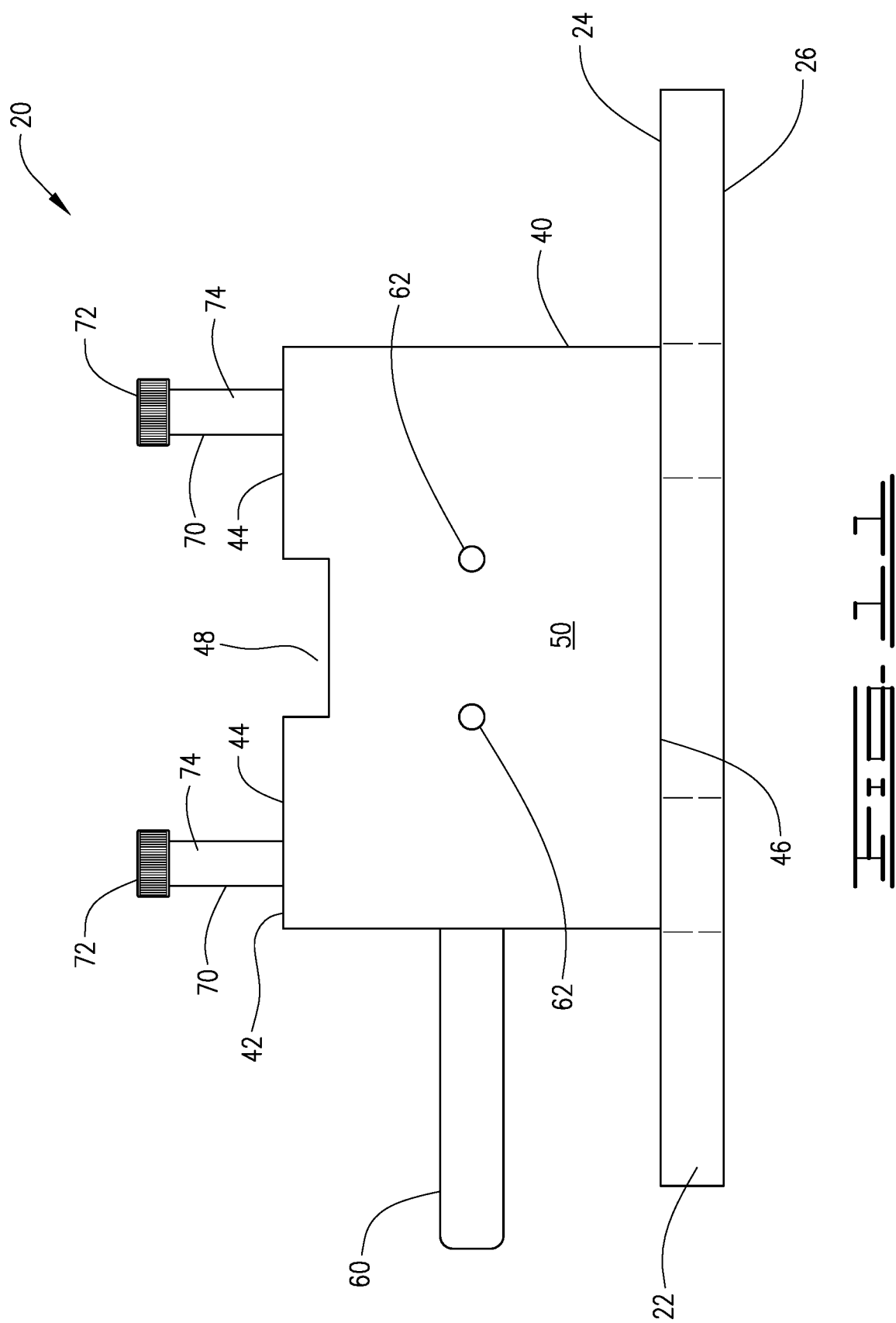
FIG. 11 is a front elevation view of the locking apparatus shown in FIG. 4, The blocking element is in its compressed position.

FIG. 11 shows the blocking element 40 in a compressed position, in face-to-face engagement with the base element 22. With the blocking element 40 in its compressed position, the lever 14 may be moved from the first position to the second or third positions, from the second position to the first position, or from the third position to the first position.

FIGS. 12-18 show a system 88 in which a valve 10 is interposed in a fluid line 92. The valve 10 has a body 90, and is controlled by a rotatable lever 14. The lever 14 has a central first position at 12 o'clock, and second and third positions in opposite clock directions from the first position. The apparatus 20 is incorporated into the system 88 by fixedly attaching the base element 22 to the body 90, by means of bolts 94 that pass through the fastener openings 30 and corresponding openings in the body 90.

Once the apparatus 20 is installed, the base element 22 is static in relation to the lever 14, and positioned without any of the lever's paths of travel. Depending on its position, the blocking element 40 is situated either within or without any path of travel of the lever 14. When positioned within any such path of travel, the blocking element 44 obstructs rotation of the lever 14 along that path.

Figure 12:
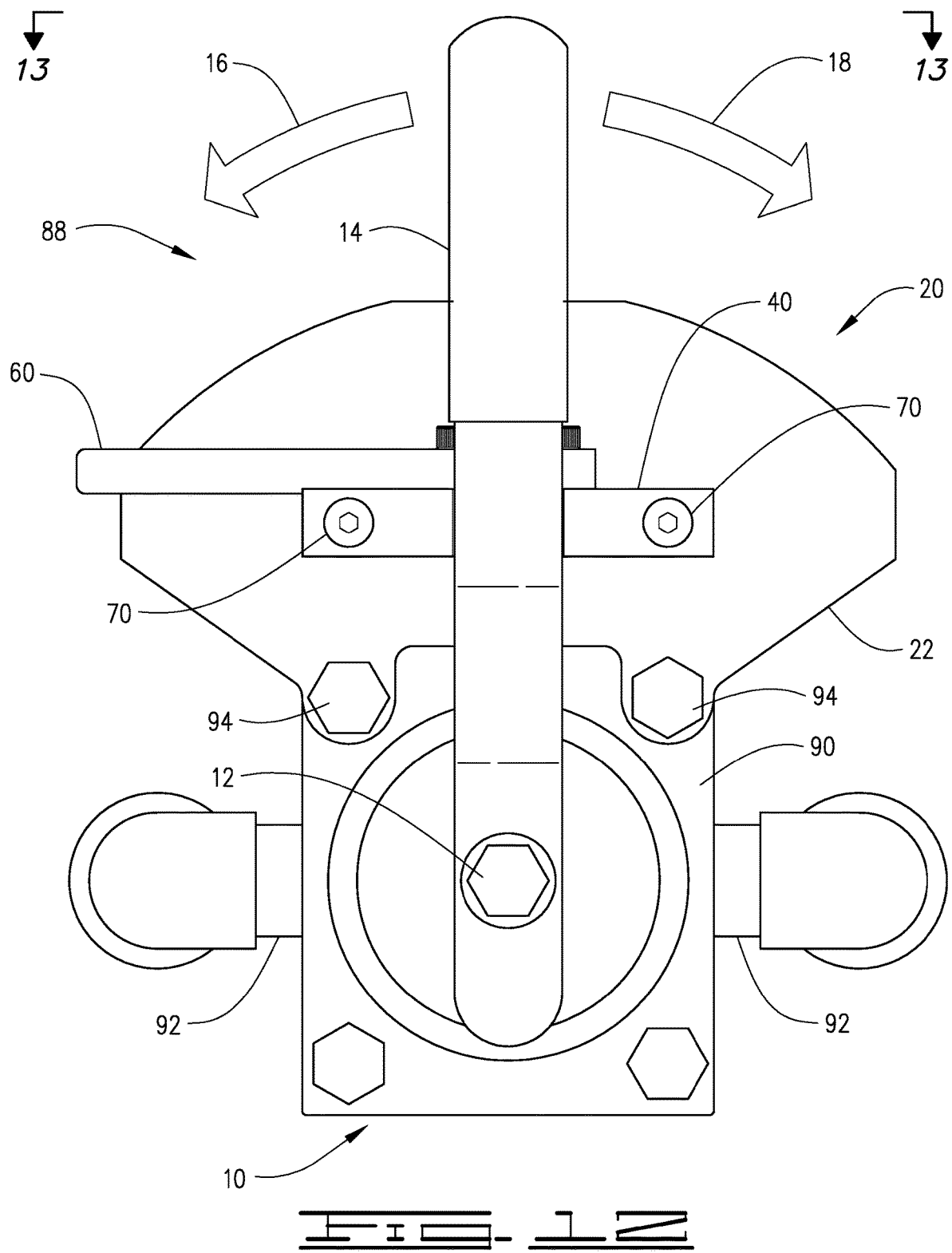
FIG. 12 is a front elevation view of a system that includes the lever-controlled valve of FIG. 1 and the locking apparatus of FIG. 4. The lever is in its first position and the blocking element is in its extended position.
Figure 13:
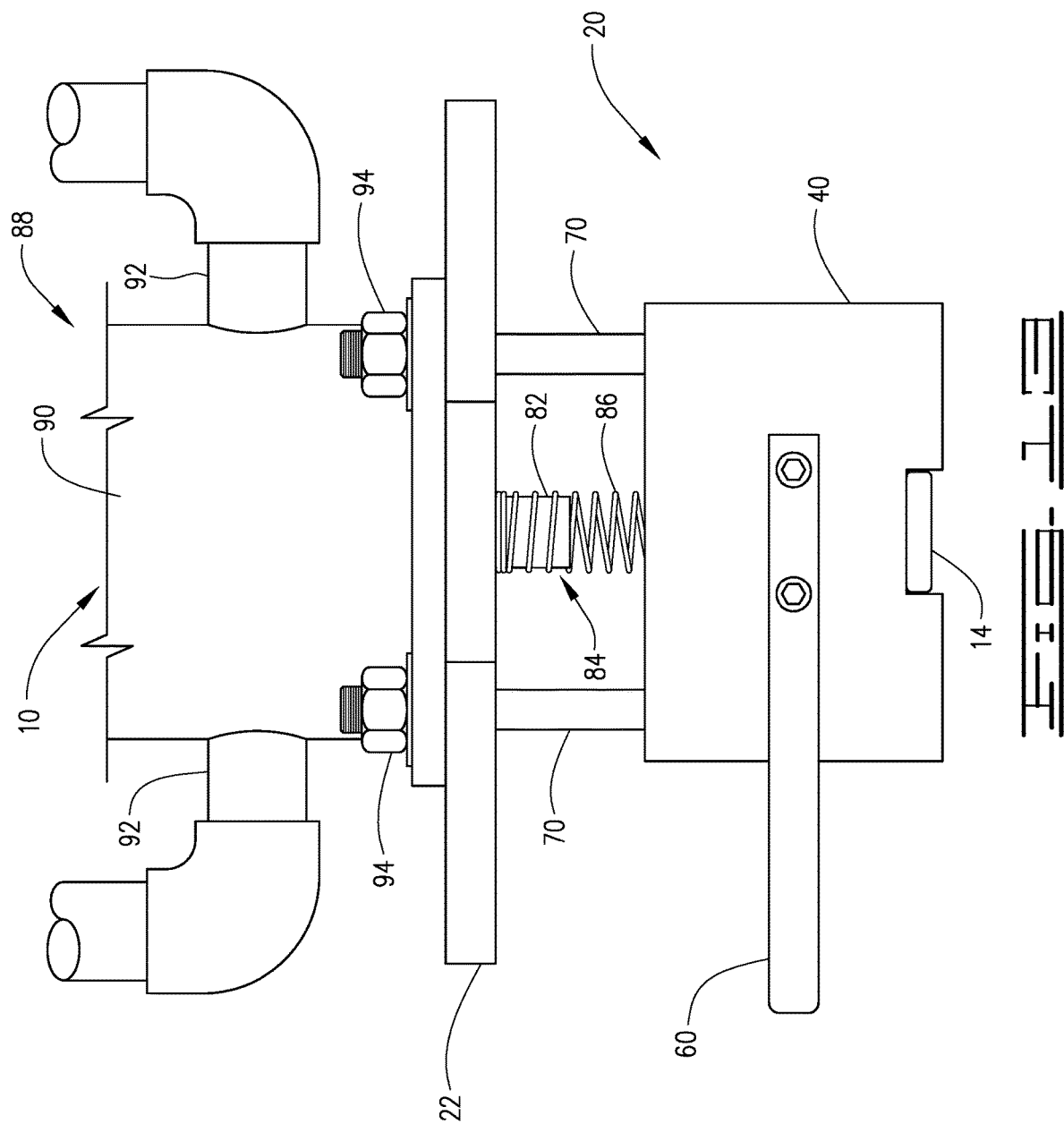
FIG. 13 is a top plan view of the system shown in FIG. 12, taken along line 13-13.

In FIGS. 12 and 13, the blocking element 40 is in its extended and uncompressed position. The lever 14 is in its first position, and rests within the channel 48. The side walls of the channel 48 obstruct rotation of the lever 14 along any path of travel.

Figure 14:
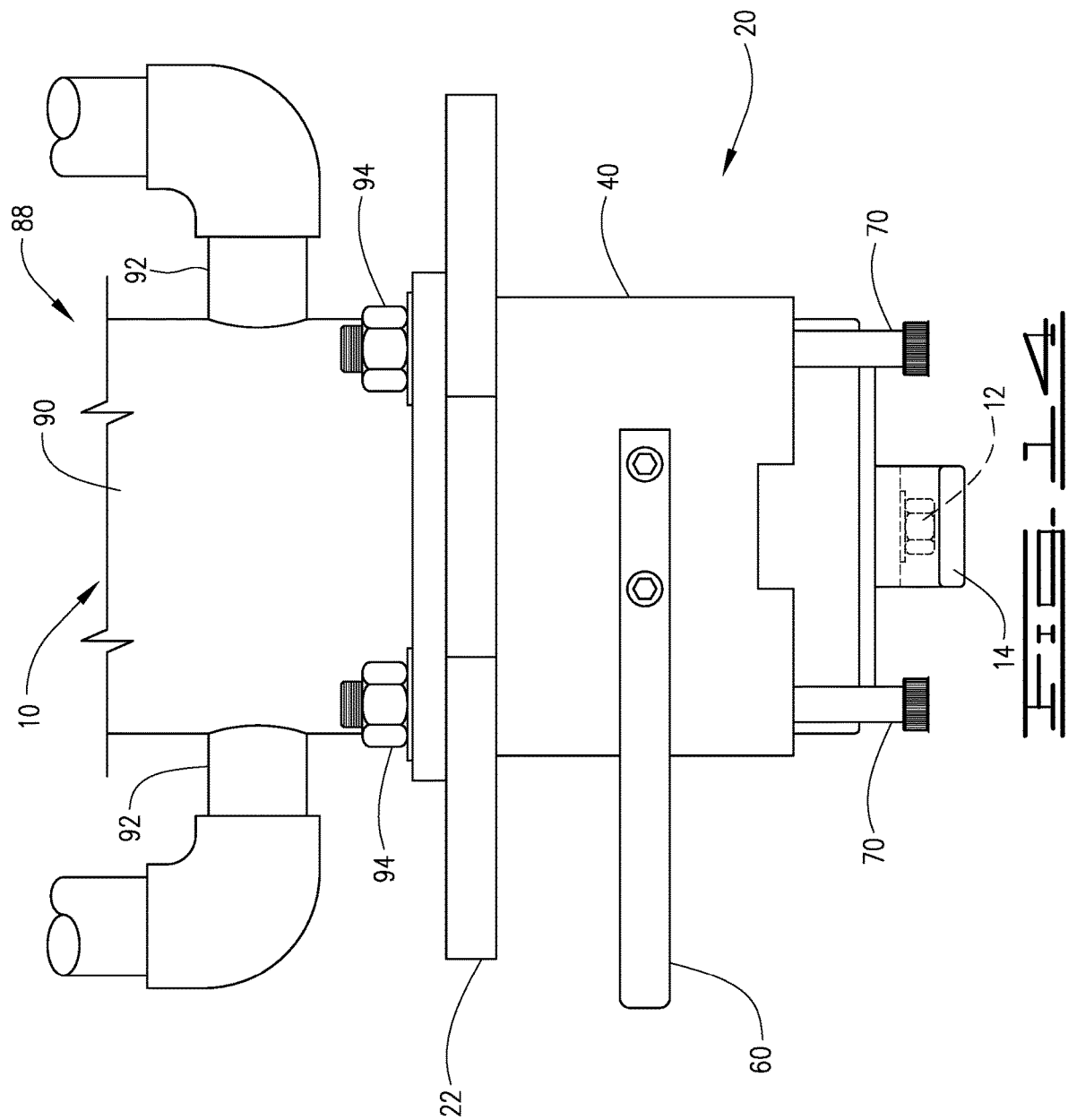
FIG. 14 is another top plan view of the system shown in FIG. 12. The blocking element is in its compressed position.

FIG. 14 shows the system 88 of FIG. 13 after the blocking element 40 has been moved to its compressed position. The lever 14 remains in its first position, but the blocking element 40 has been moved out of the paths of travel of the lever 14. As a result, the lever 14 is now free to move to either its second or third positions.

Figure 15:
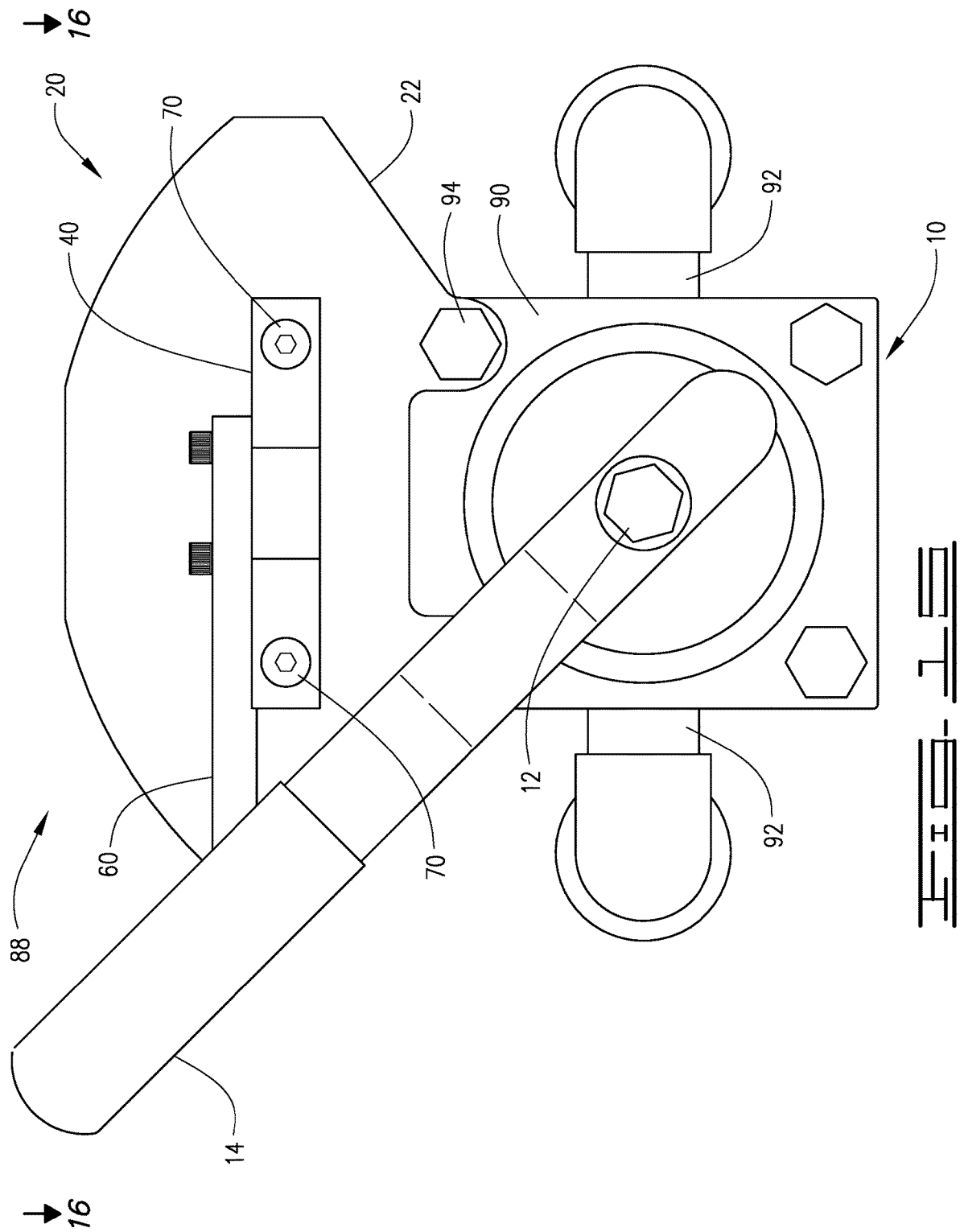
FIG. 15 is another front elevation view of the system shown in FIG. 12. The lever is in its second position and the blocking element is in its extended position.
Figure 16:
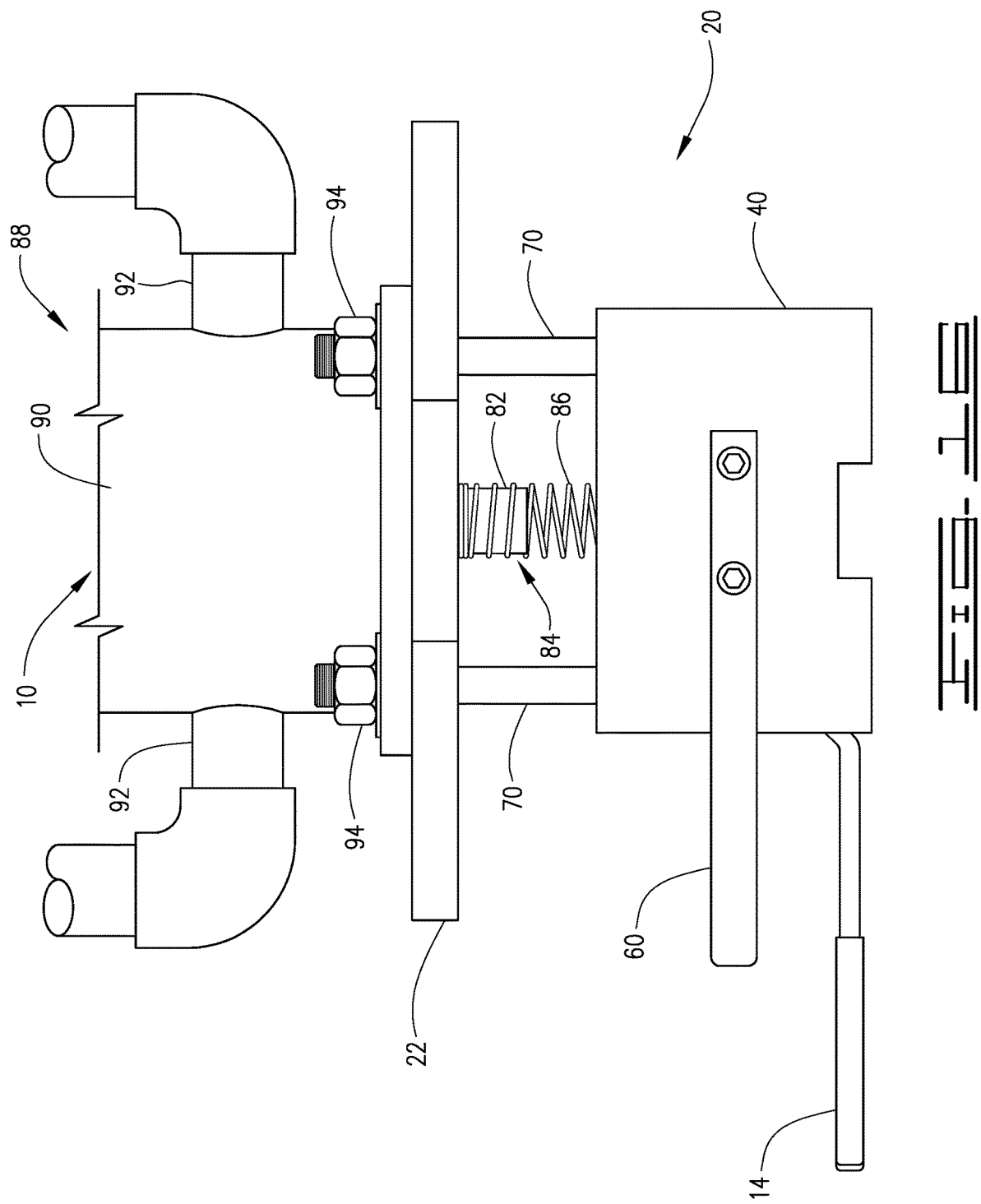
FIG. 16 is a top plan view of the system shown in FIG. 15.

FIGS. 15 and 16 show the system 88 after the lever 14 has been moved to its second position. The blocking element 40 has been restored to its extended and uncompressed position. The blocking element 40 is thus positioned within the path of travel of the lever 14, and obstructs rotation of the lever 14 along any path of travel.

Figure 17:
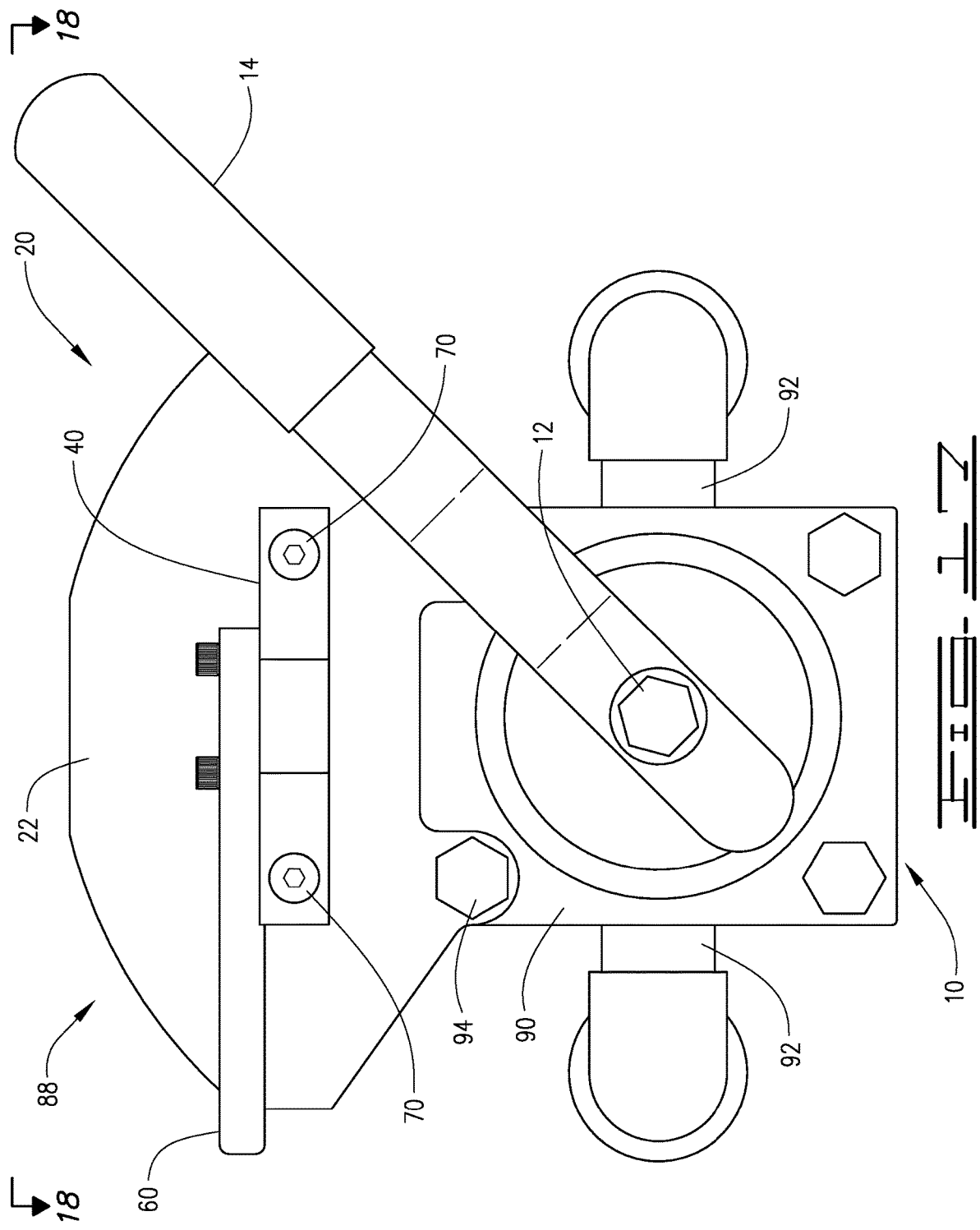
FIG. 17 is another front elevation view of the system shown in FIG. 12. The lever is in its third position and the blocking element is in its extended position.

FIGS. 17 and 18 show the system 88 after the lever 14 has been moved to its third position. The blocking element 40 has been restored to its extended and uncompressed position. The blocking element 40 is thus positioned within the path of travel of the lever 14, and obstructs rotation of the lever 14 along any path of travel.

Unless otherwise stated herein, any of the various parts, elements, steps and procedures that have been described should be regarded as optional, rather than as essential. Changes may be made in the construction, operation and arrangement of the various parts, elements, steps and procedures described herein without departing from the spirit and scope of the invention as described in the following claims.

The invention claimed is:

1. An apparatus, comprising:
   a valve containing a rotatable valve plug;
   a lever secured to the valve plug and configured to follow a path of travel outside the valve as the valve plug rotates;
   a base element, independent of the lever and positionable without the lever's path of travel;
   a blocking element supported by the base element and having a plurality of guide passages formed therein, the blocking element selectively positionable both within and without the lever's path of travel and configured to obstruct rotation of the lever when positioned within the path of travel;
   a resilient biasing system that urges the blocking element toward a position within the lever's path of travel; and
   a plurality of guide posts supported by the base element, each of the guide posts received within a corresponding one of the guide passages of the blocking element.

2. The apparatus of claim 1 in which the resilient biasing system comprises a spring.

3. The apparatus of claim 1 in which an enlarged head is formed at one and only one end of each of the guide posts and in which each of the guide passages includes a constriction sized to block passage of the head.

4. The apparatus of claim 1 in which the base element has a flat external face and the blocking element is movable along a path orthogonal to that face.

5. The apparatus of claim 1 in which the blocking element is a solid member having an external face, the majority of the area of the face situated within a single plane.

6. The apparatus of claim 5 in which the face is traversed by a channel having a width, in which the lever is an elongate member having a width, and in which the width of the channel exceeds the width of the lever.

7. The apparatus of claim 1 in which the blocking element is prism-shaped.

8. The apparatus of claim 1, further comprising:
a manually grippable handle attached to the blocking element.

9. The apparatus of claim 8 in which the handle is rigidly attached to the blocking element.

10. The apparatus of claim 1 in which the path of travel is characterized as a first path of travel having a counter-clockwise direction, and in which the lever is characterized by a second path of travel having a clockwise direction, in which the base element is positionable without the lever's second path of travel, and in which the blocking element is selectively positionable both within and without the lever's second path of travel and configured to obstruct rotation of the lever when within the second path of travel.

11. The system of claim 1 in which the base element is static in relation to the lever.

12. An apparatus, comprising:
a solid base element having a flat external upper face and a flat and parallel external lower face;
a blocking element having a plurality of guide passages formed therein;
a plurality of guide posts supported by the base element, each of the guide posts received within a corresponding one of the guide passages of the blocking element; and
a resilient biasing system that urges the blocking element away from the base element;
in which an enlarged head is formed at one and only one end of each of the guide posts and in which each guide passage includes a constriction sized to block passage of the head.

13. The apparatus of claim 12 in which the resilient biasing system comprises a spring.

14. The apparatus of claim 12 in which the base element has a flat external face and the blocking element is movable along a path orthogonal to that face.

15. The apparatus of claim 12 in which the blocking element is prism-shaped.

16. The apparatus of claim 12, further comprising:
a manually grippable handle rigidly attached to the blocking element.

17. The apparatus of claim 12 in which the blocking element has an external face, the majority of the area of the face being situated within a single plane, the face being traversed by a rectilinear channel.

18. A locking apparatus for a rotatable lever having a path of travel, comprising:
a base element, independent of the lever and positionable without the lever's path of travel;
a blocking element supported by the base element and having a plurality of guide passages formed therein, the blocking element selectively positionable both within and without the lever's path of travel and configured to obstruct rotation of the lever when positioned within the path of travel;
a resilient biasing system that urges the blocking element toward a position within the lever's path of travel; and
a plurality of guide posts supported by the base element, each of the guide posts received within a corresponding one of the guide passages of the blocking element.

19. The apparatus of claim 18 in which an enlarged head is formed at one and only one end of each of the guide posts and in which each of the guide passages includes a constriction sized to block passage of the head.

20. An apparatus, comprising:
a base element;
a blocking element having a plurality of guide passages formed therein, each of the guide passages including a constriction;
a plurality of guide posts supported by the base element, each of the guide posts having an enlarged head formed at one and only one of its ends, each of the guide posts received within a corresponding one of the guide passages of the blocking element; and
a resilient biasing system that urges the blocking element away from the base element;
in which the constriction in each of the guide passages is sized to block passage of the head of the guide post received within that guide passage.

21. An apparatus, comprising:
a valve containing a rotatable valve plug;
a lever secured to the valve plug and configured to follow a path of travel outside the valve as the valve plug rotates, the lever being an elongate member having a width;
a base element, independent of the lever and positionable without the lever's path of travel;
a blocking element supported by the base element, the blocking element being a solid member having an external face, the majority of the area of the face situated within a single plane, the face being traversed by a channel having a width that exceeds the width of the lever, the blocking element being selectively positionable both within and without the lever's path of travel and configured to obstruct rotation of the lever when positioned within the path of travel; and
a resilient biasing system that urges the blocking element toward a position within the lever's path of travel.

22. An apparatus, comprising:
a solid base element having a flat external upper face and a flat and parallel external lower face;
a blocking element having a plurality of guide passages formed therein, the blocking element having an external face, the majority of the area of the face being situated within a single plane, the face being traversed by a rectilinear channel;
a plurality of guide posts supported by the base element, each of the guide posts received within a corresponding one of the guide passages of the blocking element; and
a resilient biasing system that urges the blocking element away from the base element.

* * * * *